UNITED STATES PATENT OFFICE.

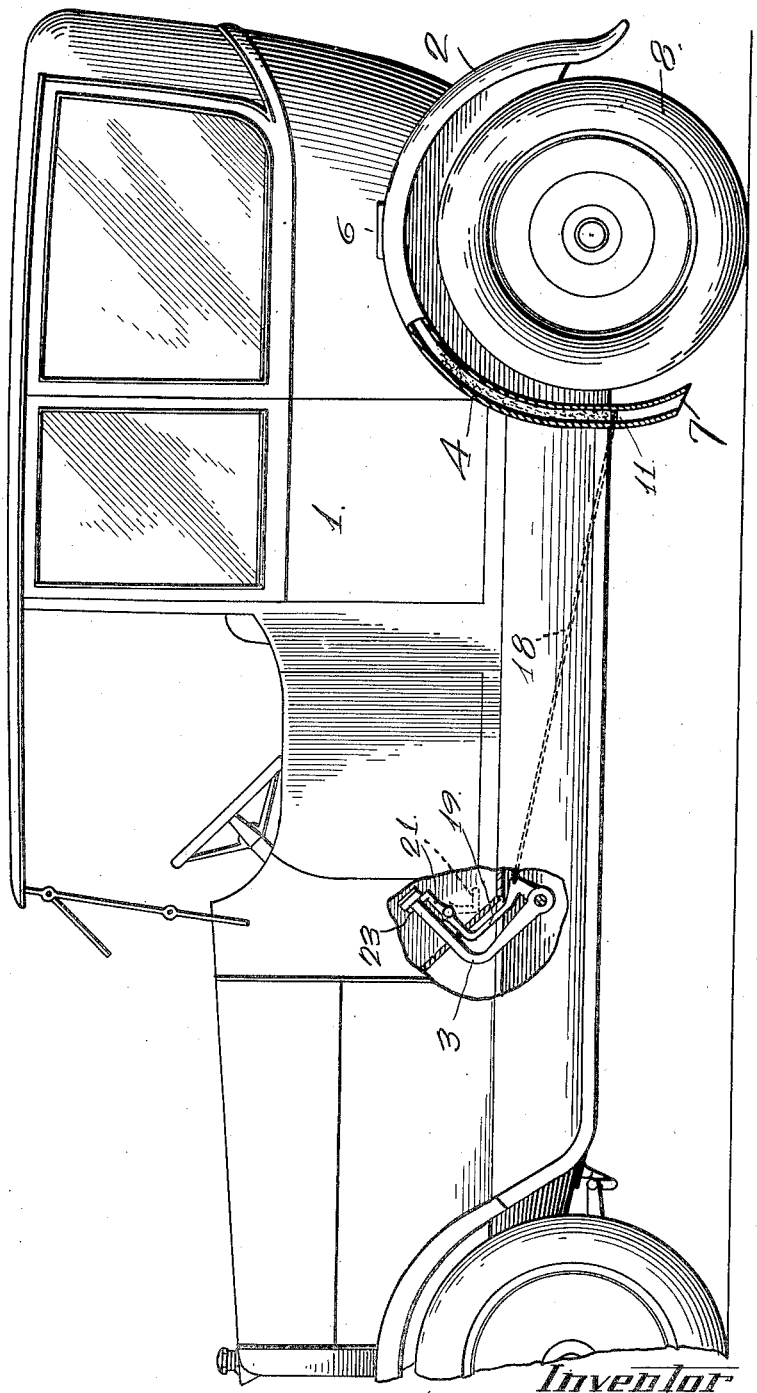

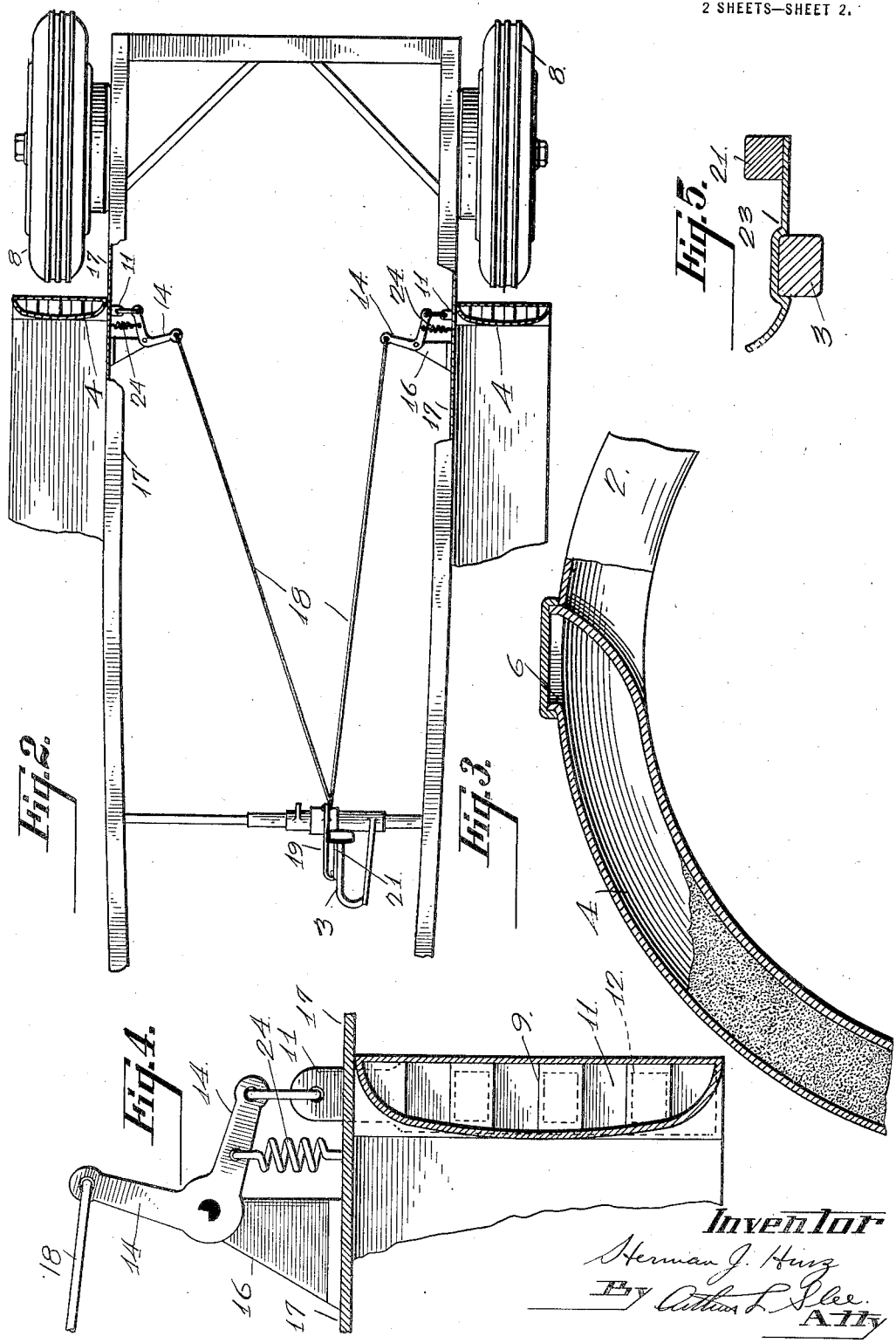

HERMAN J. HINZ, OF SAN FRANCISCO, CALIFORNIA.

SAND-DISPENSING DEVICE FOR MOTOR-VEHICLES.

1,401,078.  Specification of Letters Patent.  Patented Dec. 20, 1921.

Application filed November 30, 1920. Serial No. 427,417.

*To all whom it may concern:*

Be it known that I, HERMAN J. HINZ, a citizen of the United States, residing in the city and county of San Francisco and State of California, have invented a new and useful Improvement in a Sand-Dispensing Device for Motor-Vehicles, of which the following is a specification.

My invention relates to improvements in sand dispensing devices for motor vehicles, wherein a sand dispensing receptacle is operatively connected to the service brakes of said vehicle and operates in conjunction therewith to dispense sand directly in front of the rear wheels of said vehicle and in a degree proportionate to the amount of pressure applied to said brakes, to prevent skidding of said rear wheels.

The primary object of the present invention is to provide a new and improved device for preventing skidding of the rear wheels of a motor vehicle or the like.

A further object of the invention is to provide new and improved means of the character described having a sand dispensing receptacle mounted within the rear mud guards of said vehicle to render said receptacle inconspicuous and at the same time store the sand in the immediate vicinity of its dispensing point.

It is also an object to provide a new and improved sand dispensing device for motor vehicles and the like wherein the amount of sand dispensed will be in direct proportion to the degree of pressure applied to the service brakes.

A still further object of the present invention is to provide an improved device of the character described wherein the dispensing mechanism may be connected to and disconnected from the service brakes whereby said dispensing means may be automatically operated by pressure upon said brakes to arrest further progress of the vehicle upon slippery pavements, and whereby the same may be disconnected to prevent such dispensing when the pavements are dry.

I accomplish these and other objects by means of the improved device disclosed in the drawings forming a part of the present specification wherein like characters are used to designate similar parts throughout the said specification and drawings, and in which—

Figure 1 is a broken side elevation of a motor vehicle disclosing my improvement applied thereto;

Fig. 2 is a broken plan view of the chassis of a motor vehicle disclosing the manner in which the device is connected to and operated by the service brakes;

Fig. 3 is an enlarged broken view, partly in section, of the sand receptacle mounted within one of the rear mud guards of a motor vehicle;

Fig. 4 is an enlarged transverse sectional view of the sand dispensing means and the shutter therefor; and Fig. 5 is an enlarged sectional detailed view disclosing the manner in which the dispensing or operating mechanism may be connected and disconnected to the service brake pedal.

Referring to the drawings the numeral 1 is used to designate in general a motor vehicle having the usual rear mud guards 2 and the service brake pedal 3. Within the rear mud guards 2 is mounted a sand receptacle 4 having an opening 6 in the upper end thereof.

A depending spout 7 is arranged at the lower end of each receptacle 4 to deliver sand directly in front of the rear wheel 8 of the vehicle 1. An apertured bottom 9 is placed within the lower portion of each receptacle 4 while a transversely disposed shutter 11, having apertures 12 therein arranged, when in an open position, to register with the apertures of the bottom 9, is slidably mounted just below said bottom 9.

One end of each shutter 11 is connected to a bell crank lever 14 pivotally mounted upon a suitable bracket 16 rigidly connected to the chassis 17. A rod 18 extends from each bell crank lever 14 to a pedal 19 mounted adjacent the service brake pedal 3 and having a folding portion 21 adapted to connect and disconnect the pedal 19 with said service brake pedal 3, whereby sand may be dispensed from the receptacle 4 when pressure is applied to the brake pedal 3.

The pedal 19 is provided with the folding portion 21 in order that said pedal 19 may be disconnected from the pedal 3 to prevent dispensing of the sand when driving over a dry pavement.

To connect the pedal 19 to the brake pedal 3 the folding portion 21 thereof is moved to a position where it will be depressed by depression of the brake pedal 3 and held in such position by means of a spring clamp 23 which is attached to the pedal 19 and arranged to engage the stem of the pedal 3 as disclosed in Fig. 5 of the drawings.

In operation a slight pressure applied to the brake pedal 3, when the sand pedal 19 is connected thereto, will open the shutter 11 a sufficient amount to cause the apertures 12 therein to open the apertures of the bottom 9 a slight distance, sufficient to permit the passage of a slight amount of sand through the spout 7 and onto the rear wheels 8 of the vehicle 1, thereby creating a better traction between said rear wheels 8 and a slippery pavement, whereby skidding may be prevented.

If a greater pressure is applied to the service brake pedal 3 it is evident that a greater amount of sand will be deposited directly in front of the rear wheels 8, for the reason that the apertures 12 of the shutter 11 will register with the apertures of the bottom 4 to permit the passage of sand in direct proportion to the degree of pressure applied to the pedal brake 3.

In other words, the amount of sand dispensed from the spout 7 will be in direct proportion to the degree of pressure applied to the pedal brake 3, so that if the operator of the vehicle merely desires to slightly decrease the forward movement of said vehicle only a small portion of sand need be dispensed to prevent skidding while on the other hand, if it become necessary, in an emergency, to bring the vehicle to a sudden stop on a slippery pavement, a greater amount of sand will be required to prevent skidding when full pressure is applied to the brakes.

A suitable spring 24 is provided to normally retain the shutter 11 in a closed position and to return said shutter to a closed position after pressure has been removed from the pedal brake 3.

When driving on a dry pavement the folding portion 21 of the pedal 19 is disconnected from the service brake pedal 3 so that no sand will be dispensed when pressure is applied to said brake 3.

Having thus described my invention what I claim as new and desire to secure by Letters Patent is—

1. The combination with a motor vehicle and the rear mud guards and service brakes thereof, of a sand receptacle within said guards arranged to dispense sand directly in front of the rear wheels of said vehicle a shutter arranged to permit the passage of sand from said receptacle; means for normally closing said shutter to prevent such passage; and means operatively connected to the shutter and arranged to be connected and disconnected from the service brakes and to open the shutter a degree in proportion to the amount of pressure applied to the service brake when said means are connected thereto, whereby an amount of sand proportionate to the degree of pressure applied to said brakes may be dispensed when said brakes are applied.

2. The combination with a motor vehicle and the service brakes thereof, of a sand dispensing means arranged to dispense sand directly in front of the rear wheels of said vehicle; a shutter arranged to normally prevent the dispensing of the sand; and means operatively connected to said shutter and arranged to be connected and disconnected with said service brakes and arranged to be opened a degree in proportion with the amount of pressure applied to said brakes whereby an amount of sand in proportion to the said pressure applied may be dispensed when said means is connected to said brakes.

3. The combination with a motor vehicle and the mud guards and service brakes thereof, of a sand receptacle within said mud guards arranged to dispense sand directly in front of the rear wheels of said vehicle; a shutter arranged to permit the passage of sand from said receptacle; means for normally closing said shutter to prevent such passage; an operating pedal mounted adjacent the service brake pedal; a rod and bell crank lever operatively connected between said operating pedal and each shutter; and a spring clamp pivotally connected to said operating pedal and arranged to be moved into engagement with the brake pedal whereby said operating pedal may be operated by the brake pedal to move to the shutters to dispense an amount of sand proportionate to the pressure applied to the brakes when said brakes are applied.

In witness whereof I hereunto set my signature.

HERMAN J. HINZ.